United States Patent

Teruo

Patent Number: 5,536,568
Date of Patent: Jul. 16, 1996

[54] VARIABLE-RESISTANCE CONDUCTIVE ELASTOMER

[75] Inventor: Okamoto Teruo, Osaka, Japan

[73] Assignee: Inabagomu Co., Ltd., Osaka, Japan

[21] Appl. No.: 667,935

[22] Filed: Mar. 12, 1991

[51] Int. Cl.$^6$ .................................................. B32B 5/16
[52] U.S. Cl. .................. 428/327; 252/502; 252/510; 252/511; 428/330; 428/403; 523/218; 525/104; 525/105
[58] Field of Search .................... 428/113, 145, 428/149, 297, 308.4, 327, 323, 403, 143, 144, 330, 909; 523/218; 525/104, 105; 252/502, 510, 511

[56] References Cited

U.S. PATENT DOCUMENTS

| | | | |
|---|---|---|---|
| 3,620,900 | 11/1971 | Williger | 428/482 |
| 3,629,774 | 12/1971 | Crites | 427/122 |
| 4,044,540 | 8/1977 | Toki et al. | 428/378 X |
| 4,098,945 | 7/1978 | Oehmke | 428/327 |
| 4,145,317 | 3/1979 | Sado et al. | 252/512 |
| 4,302,361 | 11/1981 | Kotani et al. | 252/503 |
| 4,367,745 | 1/1983 | Welage | 428/327 X |
| 4,451,534 | 5/1984 | Akagi et al. | 428/372 |
| 4,612,241 | 9/1986 | Howard, Jr. | 428/294 |
| 4,613,535 | 9/1986 | Harpell et al. | 428/113 |
| 4,695,602 | 9/1987 | Crosby et al. | 524/439 |
| 4,744,842 | 5/1988 | Webster et al. | 428/313.3 |
| 4,745,301 | 5/1988 | Michalchik | 307/119 |
| 4,765,930 | 8/1988 | Mashimo et al. | 252/511 |
| 4,855,170 | 8/1989 | Darvell et al. | 428/40 |
| 5,175,214 | 12/1992 | Takaya et al. | 525/104 |

Primary Examiner—H. Thi Le
Attorney, Agent, or Firm—Armstrong, Westerman, Hattori, McLeland & Naughton

[57] ABSTRACT

An elastomeric composition comprising a non-conductive elastomer having dispersed therein (i) elastomer particles, 10–300 μm in diameter, (ii) conductive particles, 1–40 μm in diameter, and (iii) hollow and elastic microspheres, 10–50 μm in particle diameter, non-conductive when not deformed, becomes conductive when deformed by compression, extension, torsion or bending. The elastomeric composition may also have dispersed therein insulating and elastic fibers less than 100 yarn denier thick and 3–6 mm in length.

7 Claims, 8 Drawing Sheets

VARIABLE-RESISTANCE CONDUCTIVE ELASTOMER

TECHNICAL FIELD

The present invention relates to a variable-resistance conductive elastomer for use as the pressure-sensitive component or switching component in a pressure-sensitive device. More specifically, it relates to an elastomer, which has high resistance and acts as an insulator when not deformed or not under pressure, but which changes its resistance value when compressed, extended, bent or subjected to torsion, i.e., twisted.

BACKGROUND OF THE INVENTION

Conventional variable-resistance conductive elastomers contain a conductivity additive, such as metal particles, carbon fibers, graphite particles or semiconductor particles, mixed with and dispersed into a non-conductive elastomer. The non-conductive elastomers include natural rubber, synthetic rubbers such as chloroprene rubber, ethylene propylene diene rubber (EPDM), acrylonitrile rubber, styrene butadiene rubber (SBR) and silicone rubber, and thermoplastic elastomers having rubber-like elasticity.

Examined patent applications Nos. SHO 56-9187 and SHO 56-54019 disclose a composite produced by blending a base of a rubber or a flexible organic material with conductive particles of pebbly graphite having their edges rounded off. Unexamined patent application No. SHO 62-11264 discloses a composite produced by blending a base having the elasticity of an insulating rubber with conductive particles which are produced by burning and carbonizing spherical and polymeric materials. These composites, which are simply conductive particles mixed into an elastic insulating base, have the problem that they are hard, fragile and weak in impact resistance. In addition, since they are designed to respond only to compression deformation, they are inferior in mechanical strength and their resistance values may not change adequately when deformed by extension.

Examined patent applications Nos. SHO 60-722 and SHO 60-723 disclose a composite having a foamed structure produced by dispersing conductive metal particles into a liquid silicone rubber base. The foaming agent is an organic compound, such as n-propyl alcohol or n-butyl alcohol, whose parameter of solubility is more than 9.8, or an organic compound having an N-nitroso group. While an improvement in impact resistance results when the composite is foamed, the composite remains inferior in mechanical strength and durability against repeated impact. Since foamed composites are designed to respond to compression deformation, they have the disadvantage of being poor in mechanical strength and show little change in resistance when deformed by extension. Also, when a volatile alcohol is used as the foaming agent, mixing and blending of the conductive particles into the silicone rubber is very difficult. And when an organic compound having a N-nitroso group is used as the foaming agent, the cells formed on foaming are not uniform, and the composite is not uniform in its properties.

Unexamined patent application No. SHO 61-80708 discloses a composite produced by blending a base comprising a polymeric elastomer with a thin-piece conductive filler produced by plating a thin piece of mica or glass with nickel or copper. The composite is capable of making an adequate response on extension deformation. However, the thin-piece conductive filler, which is arranged in parallel to the direction of extension, causes the composite to be hard and fragile, and to have inferior mechanical strength and low resistance to impact. In addition, because it is designed only to respond to extension deformation, it does not respond adequately on compression deformation. And since the conductive filler is thin, it does not respond well to deformation by bending or twisting.

SUMMARY OF THE INVENTION

An object of the present invention, made in light of solving the aforementioned problems, is to provide an improved variable-resistance conductive elastomer comprising: elastomer particles, 10–300 μm in diameter; conductive particles, 1–40 μm in diameter; and hollow and elastic micropheres, 10–150 μm in diameter; dispersed into a non-conductive elastomer. Insulating and elastic fibers, less than 100 denier in thickness, are preferably included in the dispersion.

The non-conductive elastomer may be a silicone rubber, a liquid silicone rubber, a silicone varnish, a silicone raw rubber or an elastomer comprising a silicone adhesive consisting mainly of those materials; preferably, the non-conductive elastomer is a powder of a crosslinked silicon rubber. The conductive particles may be obtained by adhering insulating particles, 0.05–0.2 μm in diameter, to the surface of globular carbon particles covering 30–70% of the surface area of the carbon particles. The hollow and elastic microspheres generally have shells made of a copolymer of vinylidene chloride and acrylonitrile. The insulating and elastic fibers are usually polyethylene, polyamide, fiber, aramid, polyester or polyurethane fibers, or composite fibers consisting of these fibers, which have undergone a surface activation treatment.

DETAILED DESCRIPTION OF THE INVENTION

Figure 1:
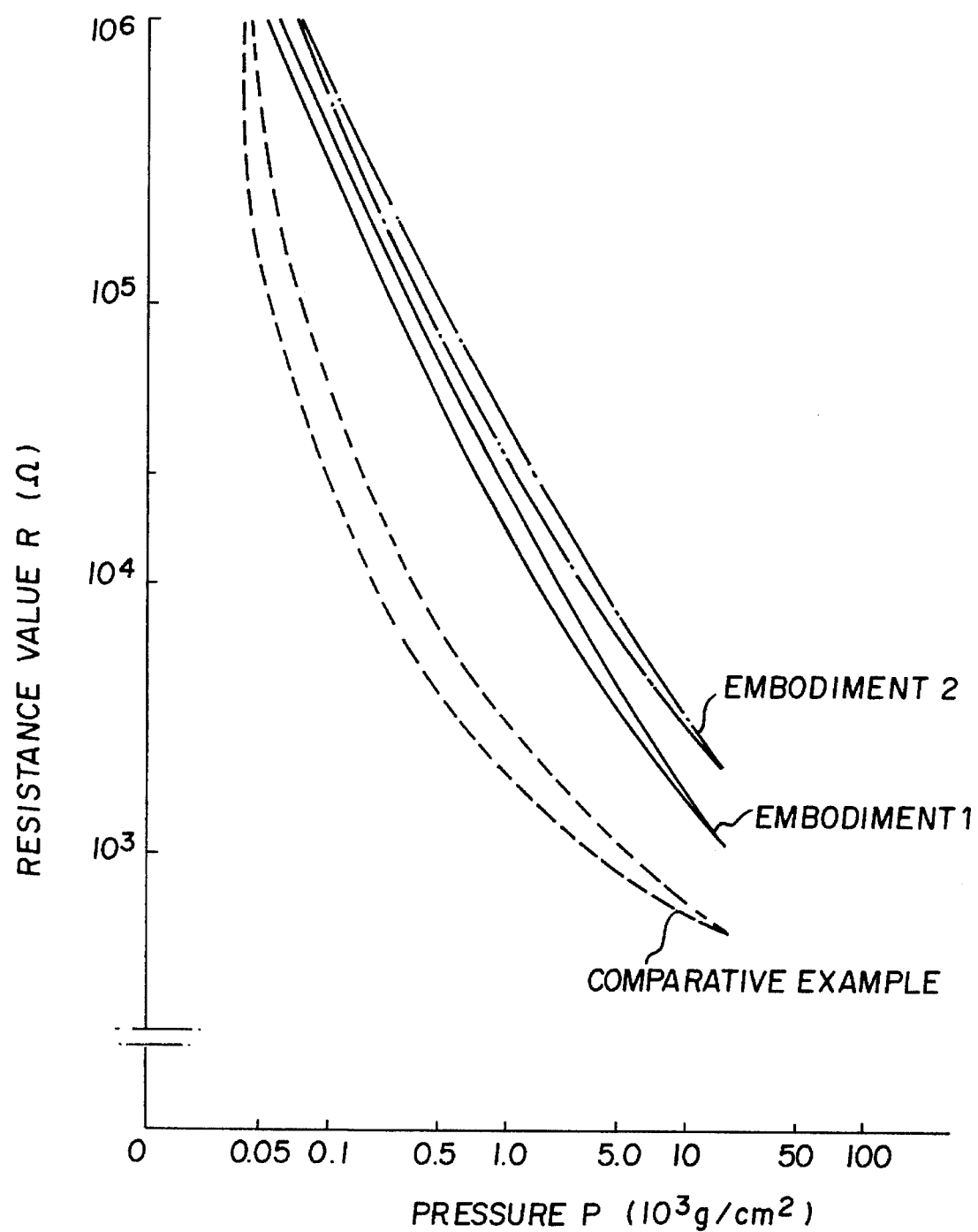
FIG. 1 is a graph of the change in resistance of embodiments of the invention and that of a comparative example plotted against the pressure applied.

As the non-conductive elastomer, the first constituent of the composition of the present invention, a conventional, one-component, room temperature vulcanized silicone rubber is preferred. The rubber is of the condensation type and undergoes hydrolysis, initiated by moisture in the air, and becomes crosslinked. A varnish obtained by diluting a polysiloxane having silanol groups with an organic solvent such as toluene or xylene, a silicone raw rubber comprising a straight-chain polysiloxane having a molecular weight of 150,000–500,000, or the mixture of the silicone varnish and a silicone adhesive containing as its main component a silicone raw rubber, and a filler and a plasticizer may be added to a liquid silicone rubber. Such addition improves the strength of adhesion to the conductive particles and the tear strength of the variable-resistance conductive elastomer, when compared to only using the liquid silicone rubber.

As the elastomer particles, the second constituent of the composition of the present invention, particles of an elastomer with rubbery elasticity or a crosslinked rubber are prefered. Mixing and dispersing those elastomeric particles into the composition of the present invention facilitates alloying of the various polymer constituents in the composition with one another. "Ocean layers" and "island layers" are formed which soften the composition increasing its elasticity and the maximum length it can be extended, and which prevent it from becoming fragile. The resultant composition has adequate strength, not only against compression deformation, but also against extension, twisting, and bending deformations, significantly changing its resistance as those deformations takes place.

The elastomer particles may be of a thermoplastic elastomer such as a copolymer of styrene and butadiene or an ethylene propylene rubber, a polyurethane or a polyester, or a crosslinked synthetic rubber, such as a silicone rubber, a fluoro rubber, an EPDM rubber, an acrylonitrile rubber, a chloroprene rubber or a styrene-butadiene rubber. If the non-conductive elastomer is a silicone rubber, a crosslinked silicone rubber powder is prefered as the elastomer particles. If particles of another elastomer are used, it is necessary that they be surface treated with a silane coupling agent.

The diameters of the elastomer particles are 10–300 μm, preferably 50–100 μm, for adequate response to extension deformation. Particles less than 10 μm of diameter are more difficult to prepare and are not very effective as a reinforcing material. Particles with a diameter over 300 μm present difficulties in connecting the conductive particles and the elastomer to each other, and uniform results are not obtained.

As the conductive particles, as the third constituent of the composition of the present invention, particles of nickel, copper, gold, silver, stainless steel, aluminium, iron, chromium, graphite, or carbon particles, or composites or alloys thereof may be used. The carbon particles may be mesocarbon microbeads produced by heating small spheres of polystyrene, polyvinyl chloride or polyvinylidene chloride in air to 300° C., and then burning the spheres in an inert gas at a temperature up to 1000° C. Or the carbon particles may be glass-like particles produced by heating small particles of a phenolic resin or a furan resin in a vacuum at 800° C.–1000° C.

The diameters of the conductive particles should be within the range of 1–40 μm. If the diameters of the conductive particles are less than 1 μm, they become difficult to produce and their ability to change resistance on deformation is reduced in proportion to the reduction in diameter. On the other hand, if the diameters of the conductive particles is over 40 μm, the change in resistance on deformation becomes uneven.

If the conductive particles constitute less than 25% by weight of the composition of the present invention, the composition has too high a resistance value. On the other hand, if the conductive particles constitute more than 45% by weight of the composition, the composition may be in the conductive state even when not deformed. Surface treating the conductive particles improves the adhesion strength between the conductive particles and the non-conductive elastomer.

Insulating particles, 0.05–0.2 μm in diameter, may be adhered to the surface of the conductive particles, preferably spherical carbon particles, covering 30–70% of the surface area of the conductive particles. The insulating particles may be of calcium oxide, titanium oxide or silicon oxide. Adhesion of the insulating particles at the indicated range provides for a limited degree of contact when the conductive particles contact each other. This results in a gradual change in the resistance value of the variable-resistance conductive elastomer on deformation and improved linearity of the change in the resistance value with respect to the extent of deformation.

The fourth constituent of the composition of the present invention is hollow and elastic microspheres superior in elasticity and impact absorbency, which are mixed and dispersed into the non-conductive elastomer. This decreases the hardness of the non-conductive elastomer blended with the conductive particles, and improves the durability and the impact resistance of the non-conductive elastomer, particularly when the non-conductive elastomer is a silicone rubber. A preferred example of hollow and elastic microspheres are PVDC microballoons, where the shells are a vinylidene chloride-acrylonitrile copolymer, produced by expanding and drying the copolymer containing an inflating agent such as isobutane.

The diameters of the microspheres are 10–150 μm, preferably 20–80 μm, with an average diameter of 50 μm, and the thickness of the shell walls is about 0.1 μm. If the diameter of the particles is less than 10 μm, they become too small and their impact absorbency and vibration absorbency are decreased. And if the diameter of the particles is over 150 μm, the hollow portion of the elastic microspheres is increased to such an extent that the strength of the variable-resistance conductive elastomer composition of the present invention is decreased.

Preferably, the composition contains 10–30% by weight of the hollow and elastic microspheres. If the composition contains less than 10% by weight of those microspheres, significant improvements in durability and impact absorbency are not obtained. If the composition contains more than 35% by weight of the microspheres, the change in resistance during deformation is markedly decreased.

The composition of the present invention may contain, as its fifth constituent, 0.01–0.1% by weight of insulating and elastic fibers. These fibers may be straight or curved fibers 3–6 mm in length or stretchable fibers having repeated stitches at a pitch of 0.2–1.0 mm. Preferably, the stitches are hosiery stitches, rib stitches or garter stitches regularly arranged regularly at the indicated pitch. If the length of the fibers is out of the 3 mm to 6 mm range, dispersibility, workability, moldability and reinforcing properties of the fibers with respect to the non-conductive elastomer are no longer advantageous. If the repeating pitch of the fiber having repeated stitches is less than 0.2 mm, the fiber becomes inferior in strechability decreasing its reinforcing effect.

The insulating and elastic fibers may be organic fibers such as polyethylene, polyamide, polyester, polyurethane, acrylic or aramid fibers of a thickness less than 100 denier, preferably 7–100 denier. If the thickness is over 100 denier, the variable-resistance conductive elastomer becomes so hard that it is not easily deformed. If the thickness is less than 7 denier, the reinforcing effect of the fibers is poor.

When the non-conductive elastomer is a silicone rubber, the fiber is surface activated using a silane coupling agent, such as γ-aminopropyltriethoxysilane, $H_2NC_3H_6Si(OC_2H_5)_3$, or vinyltrichlorosilane, $CH_2=CHSiCl_3$. The coupling agent may be used mixed into the silicone rubber. When elastomer other than a silicone rubber is used as the non-conductive elastomer, the fibers may be surface activated chemically using a titanium or chromium compound as the coupling agent; or the activation may be physical using ultraviolet light, or a plasma or an ion beam. The fibers have good three-dimensional flexibility and are deformed together with the non-conductive elastomer. Chemical or physical surface activation treatment of the fibers reinforces their adhesive strength to the non-conductive elastomer, improving the physical strength and durability of the variable-resistance conductive elastomer.

In summary, the variable-resistance conductive elastomer of the present invention contains conductive particles having a diameter of 1–40 μm to provide for an adequate change in resistance upon deformation, hollow and elastic microspheres having a particle diameter of 10–150 μm to improve strength, impact absorbency and the vibration absorbency, and elastomer particles having a diameter of 10–30 μm to soften and make less fragile the variable-resistance conductive elastomer, all dispersed in a non-conductive elastomer. The conductive elastomer and the conductive particles may be blended with one another to construct "ocean layers" and "island layers" making it easier to grind the particles and to obtain an even distribution of the conductive particles in the non-conductive elastomer. As a further modification, insulating and elastic fibers having a thickness less than 100 denier are incorporated into the variable-resistance conductive elastomer to control its hardness and markedly improve its strength, particularly in the case of extension deformation.

The present invention is not limited to the specific embodiments of the invention described below.

EMBODIMENTS

Embodiment 1

Thirty grams (18.8% by weight) of a crosslinked silicone rubber powder having a particle size of 50–200 μm produced by grinding a crosslinked silicone rubber (silicone rubber SH861U crosslinked with 0.5% by weight of crosslinking agent RC-4 made by Toyo Reiyon Dauconingu Kabushiki Kaisha) and 0.6 g (0.4% by weight) of hollow and elastic microspheres 10–100 μm in particle diameter and 40 μm in average particle diameter having shells of a vinylidene chloride-acrylonitrile copolymer (EXPANCEL-DE551 made by Ekusupanselu Sweden) were mixed and dispersed into microspheric carbon particles 1–20 μm in diameter (carbon microbeads ICB-0510 made by Nihon Cabon Kabushiki Kaisha). Then, 64 g (40% by weight) of a one-component room temperature vulcanizable silicone rubber (KE-441 made by Shinetsu Kagaku Kougyo Kabushiki Kaisha) was added and mixed together with the dispersion for 5 minutes. The mixture was defoamed and placed in a polyethylene mold measuring 200 mm×100 mm×2.0 mm to form a sheetlike article, and after being hardened at 15° C. at a relative humidity of 60–70%, it was heated at 70° C. for 1 hour. The changes in resistance of samples of the resultant composition, when deformed by compression and extension, were measured as described below.

Figure 4:
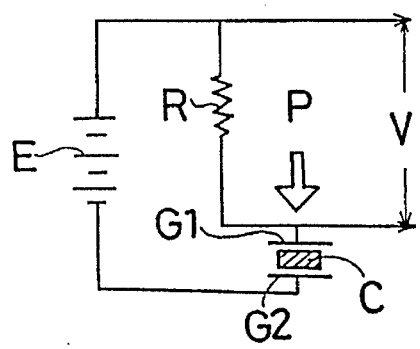
FIG. 4 is a diagram of the circuit used to measure the electrical resistance of the composite undergoing compression deformation.
Figure 5:
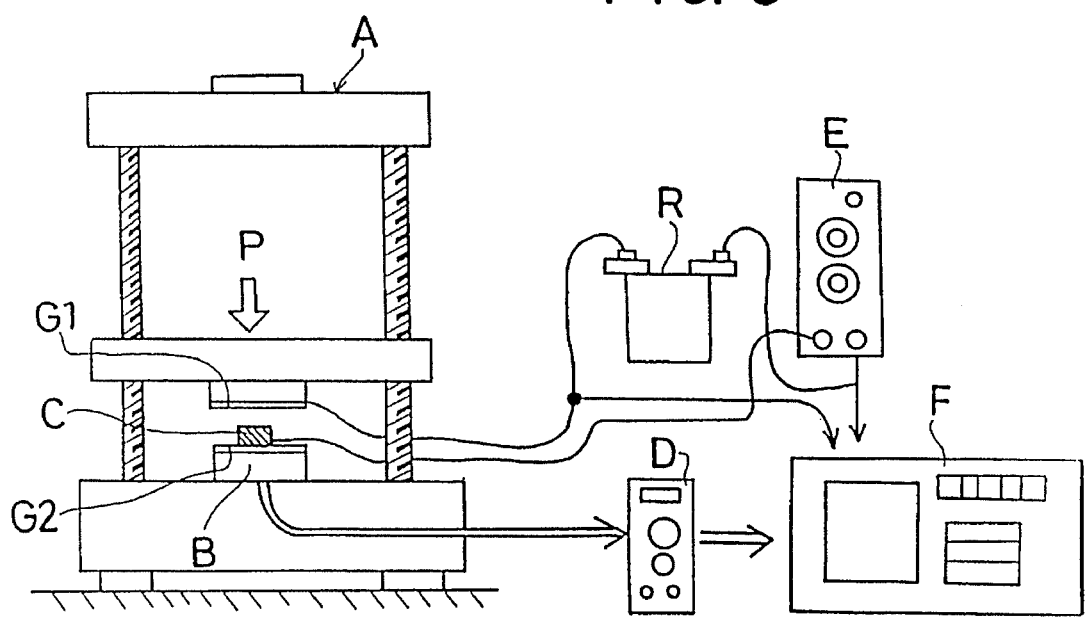
FIG. 5 is a block diagram of the device used to apply pressure and measure the compression deformation.

FIG. 4 illustrates the circuit for measuring the change in resistance against compression deformation, wherein E is the power supply for constant-voltage DC, R is a standard resistor, P is pressure/speed (5 mm/min), V is a means for varying the voltage and C is a sample measuring 10 mm×10 mm×2.0 mm. FIG. 5 illustrates the measuring device, wherein A is a pressure and extension tester, B is a small-sized load converter, D is a dynamic-distortion measuring unit, F is an analyzing recorder, and G1 and G2 are measuring electrodes, gold-plated copper PC boards measuring 20 mm×20 mm×1.6 mm. The measuring procedure involves the steps of placing the sample C between measuring electrodes G1 and G2, installing the small-sized load converter for measuring the pressure force under the measuring electrodes G1 and G2, pressing the sample at pressure speed P by moving down measuring electrode G1, calculating the resistance value from the voltage V corresponding to the pressing action, and outputting the pressure force by the dynamic-distortion measuring unit D. The result are shown as embodiment 1 in the graph (bilogarithmic scale) of FIG. 1.

Figure 6:
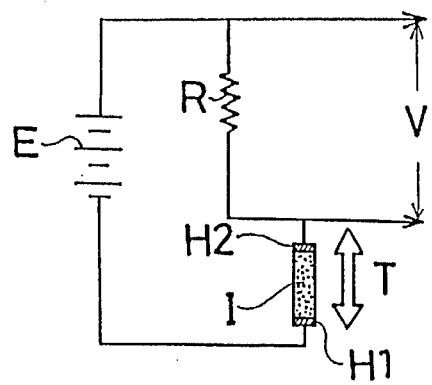
FIG. 6 is a diagram of the circuit used to measure the electrical resistance of the composite undergoing extension deformation.
Figure 7:
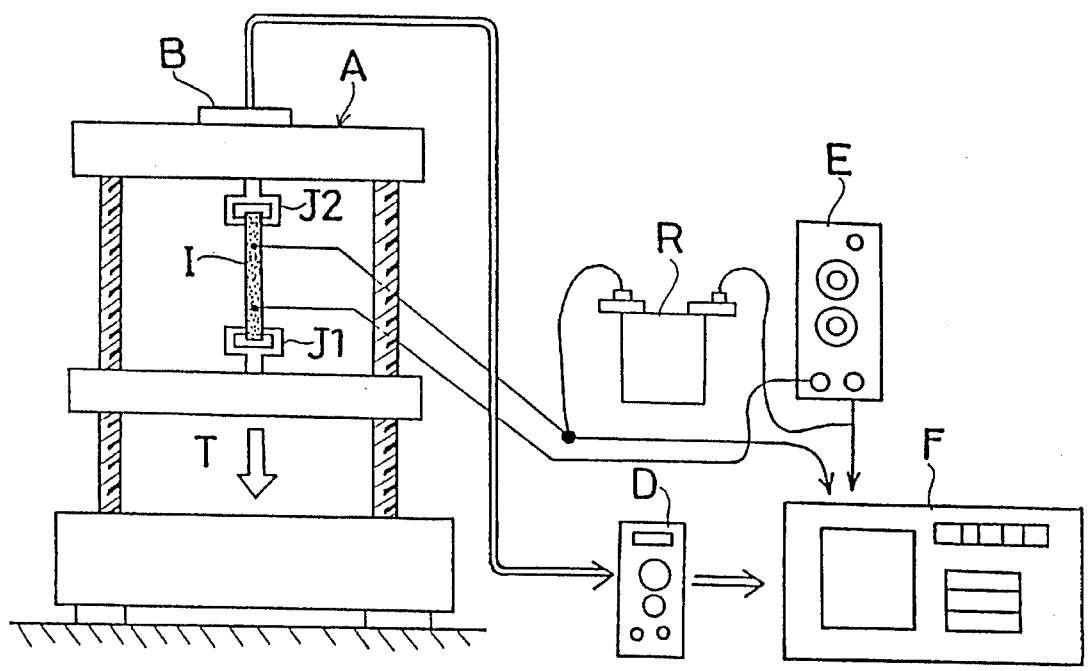
FIG. 7 is a block diagram of the device used to extend a composite and measure the deformation of the composite being extended.

FIG. 6 illustrates the circuit for measuring the change in resistance against extension deformation. E, R, and V have the same meanings as in FIG. 4, H1 and H2 are extension/speed (5 mm/min.), and I is a sample measuring 15 mm×4.0 mm×2.0 mm. FIG. 7 illustrates the measuring device, wherein A, B, D, F, E and R have the same meanings as in FIG. 5. The measuring process involves the steps of holding the sample I, to which the electrodes H1 and H2 are connected, between chucks J1 and J2, extending sample I at the extension speed T by moving down the chuck J1, calculating the resistance value from the voltage V corresponding to the amount of extension, and outputting the extension force by the dynamic-distortion measuring unit D. The results are shown as embodiment 1 in the graph (unilogarithmic scale) of FIG. 2.

Figure 2:
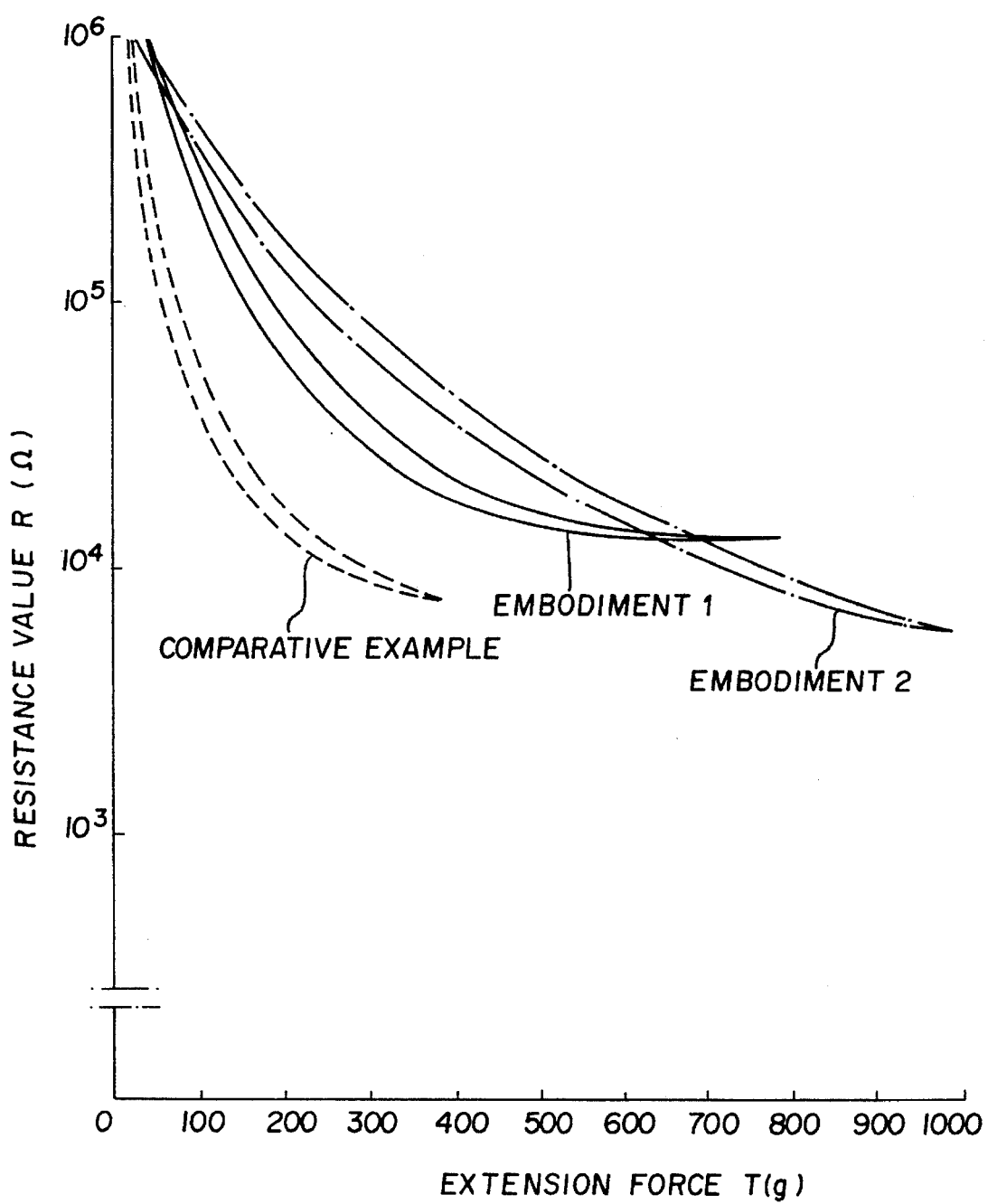
FIG. 2 is a graph of the change in resistance of embodiments of the invention and that of a comparative example plotted against the force of extension.

The dotted lines of FIGS. 1 and 2 (comparative example) shown measurements on a sample identical to that of embodiment 1, but from which the silicone rubber powder was omitted.

Embodiment 2

A silicone rubber powder was prepared by kneading 100 parts by weight of a silicone rubber (KE-971U made by Shinetsu Kagaku Kogyo Kaubshiki Kaisha) with 0.4 parts by weight of a crosslinking agent (C-8A made by Shinetsu Kagaku Kogyo Kabushiki Kaisha). After curing under pressure at 160° C. for 15 minutes, the crosslinked silicone rubber was ground to particles having a diameter of 50–300 μm and filtered through a #70 mesh stainless steel filter. A stocking cloth (made by Kanegafuchi Kabushiki Kaisha) measuring 250 mm×250 mm, obtained by knitting a polyamide fiber 13 denier in thickness in a hosiery manner at a pitch of 0.3–0.7 mm, was surface activated by treatment with an aminosilane coupling agent (KBE903 made by Shinetsu Kagaku Kogyo Kabushiki Kaisha). Then, 20 g (11% by weight) of the silicone rubber powder and 0.8 g (0.43% by weight) of hollow and elastic microspheres 10–100 μm in particle diameter and 40 μm in average particle diameter having a shell made of a vinylidene chloride-acrylonitrine copolymer (EXPANCEL-DE551 made by Ekusupanseru Sweden) were mixed together and dispersed into glasslike microspheric carbon particle 1–12 μm in diameter (glass carbon P, GP-5X made by Owada Kabon Kogyo Kabushiki Kaisha). A mixture obtained by mixing 50 g (27.3% by weight) of a one-component room temperature vulcanizable silicone rubber (SE5002 made by Toyo Reiyon Daukon Kabushiki Kaisha) and 35 g (19.1% by weight) of silicone adhesive (YR3340 made by Tooshiba Silikon Kabushiki Kaisha) was mixed with the glasslike microspheric carbon particles into which the silicone rubber powder and the hollow and elastic microspheres had been dispersed. (The microspheric carbon particles had insulating particles adhered to 30–70% of their surface area and were prepared by blending inorganic particles 0.05–0.2 μm in diameter, with particles, 5–20 μm is diameter, of a phenolic, epoxy or polyamide resin, and carbonizing the resin at 800°–1000° C. in a vacuum or in the presence of an inert gas). The resultant mixture was defoamed and surface-activated as described above and placed into a polypropylene mold, measuring 150 mm×200 mm×2.0 mm, to form a sheetlike article with the cloth located at the central part of the sheet. After hardening at a temperature of 10° C. and a humidity of 80% 24 hours, the sheet was heat treated at 70° C. for 1 hour.

Changes in resistance due to compression and extension deformation were measured, using the same methods as described above, and the results are shown as embodiment 2 in the graphs of FIGS. 1 and 2.

Figure 3:
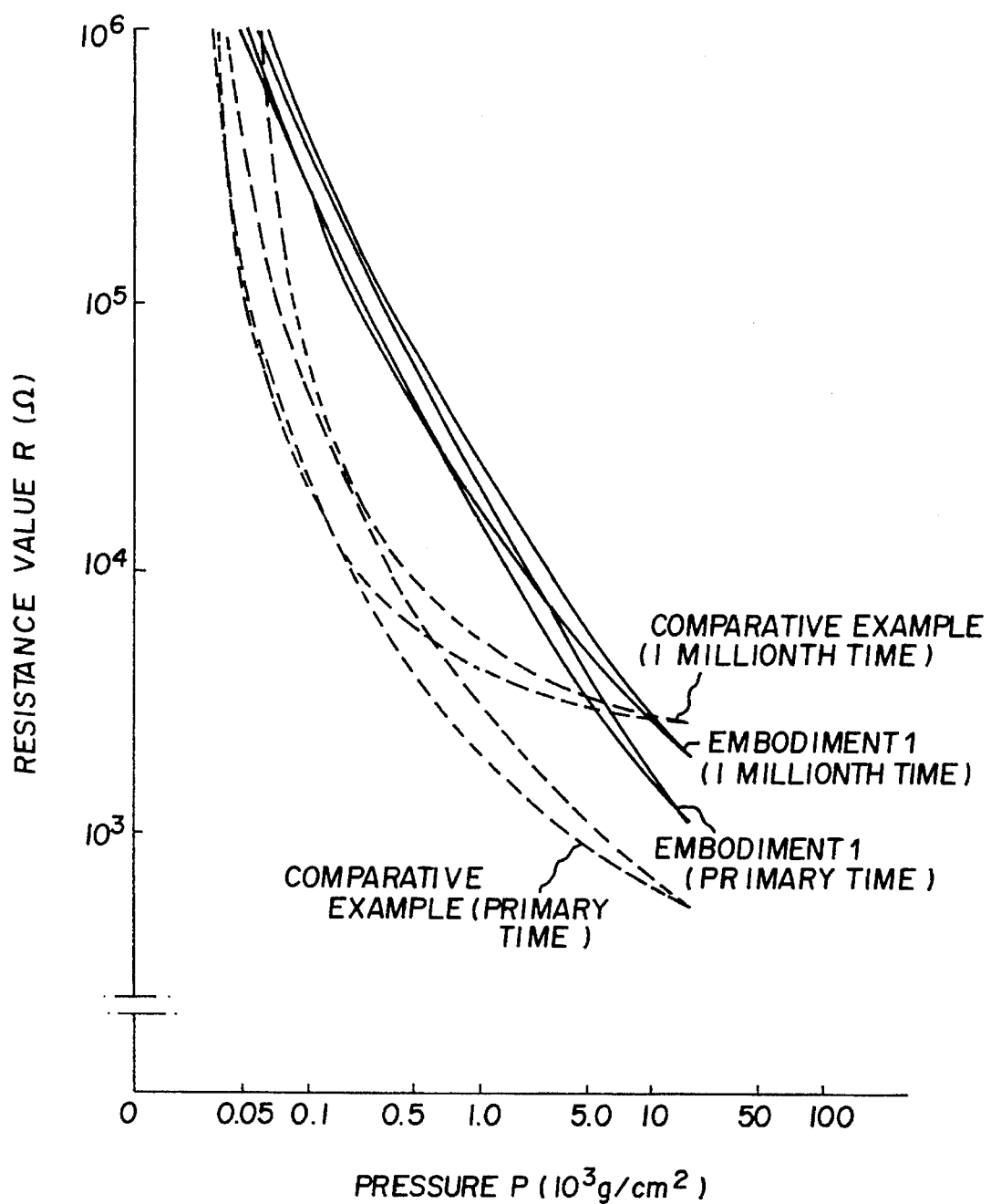
FIG. 3 is a graph of the change in resistance for an embodiment of the invention and that of a comparative example plotted against pressure before and after endurance testing.

The graph (unilogarithmic scale) of FIG. 3 shows the results of endurance tests on embodiment 1 and on the comparative example corresponding to that embodiment. Each test involved a process repeated one million times where the sample was kept at the ON-state (loaded state) at 2 kg/cm$^2$ load for 1 minute and then in the OFF-state (non-load state) for 3 minutes.

The test results on the samples of embodiment 1, embodiment 2 and the comparative example with the sample undergoing compression deformation, extension deformation, bending deformation and deformation by torsion or twisting, are shown in Tables 1, 2, 3, and 4 below. The measurements relating to bending deformation were the electric resistance values on bending deformation induced by the action of a load on a long end of a sample (the opposite end being fixed) measuring 35 mm×4.0 mm×2.0 mm, with the electrodes connected to opposite ends of the sample. The measurements made during torsion or twisting deformation were of the electric resistance values at a deformation induced by giving a rotational force to the area around the center shaft line of a long end of the sample (the opposite end being fixed) measuring 35 mm×4.0 mm×2.0 mm, with electrodes being connected to the ends of the sample.

TABLE 1

| Pressure force (g/cm$^2$) | Resistance R (Ω) | | | | | |
|---|---|---|---|---|---|---|
| | Embodiment 1 | | Embodiment 2 | | Comparative example | |
| | Pressurized | Decompressed | Pressurized | Decompressed | Pressurized | Decompressed |
| 0 | Over 10$^7$ | 1000 × 10$^3$ | Over 10$^7$ | Over 10$^7$ | Over 10$^7$ | 100 × 10$^3$ |
| 50 | 1000 × 10$^3$ | 860 × 10$^3$ | 1230 × 10$^3$ | 1100 × 10$^3$ | 1000 × 10$^3$ | 800 × 10$^3$ |
| 100 | 800 × 10$^3$ | 720 × 10$^3$ | 812 × 10$^3$ | 670 × 10$^3$ | 100 × 10$^3$ | 52 × 10$^3$ |
| 200 | 460 × 10$^3$ | 390 × 10$^3$ | 462 × 10$^3$ | 402 × 10$^3$ | 50 × 10$^3$ | 28 × 10$^3$ |
| 300 | 200 × 10$^3$ | 160 × 10$^3$ | 189 × 10$^3$ | 148 × 10$^3$ | 18 × 10$^3$ | 9.2 × 10$^3$ |
| 500 | 120 × 10$^3$ | 86 × 10$^3$ | 130 × 10$^3$ | 100 × 10$^3$ | 8.0 × 10$^3$ | 5.5 × 10$^3$ |
| 800 | 51 × 10$^3$ | 40 × 10$^3$ | 62 × 10$^3$ | 51 × 10$^3$ | 4.5 × 10$^3$ | 2.7 × 10$^3$ |
| 1 × 10$^3$ | 23 × 10$^3$ | 18 × 10$^3$ | 45 × 10$^3$ | 35 × 10$^3$ | 3.5 × 10$^3$ | 2.2 × 10$^3$ |
| 2 × 10$^3$ | 14 × 10$^3$ | 10 × 10$^3$ | 19.1 × 10$^3$ | 16.0 × 10$^3$ | 2.0 × 10$^3$ | 1.4 × 10$^3$ |
| 3 × 10$^3$ | 8.6 × 10$^3$ | 7.6 × 10$^3$ | 10.4 × 10$^3$ | 9.2 × 10$^3$ | 1.5 × 10$^3$ | 1.2 × 10$^3$ |
| 5 × 10$^3$ | 6.6 × 10$^3$ | 6.0 × 10$^3$ | 8.2 × 10$^3$ | 7.7 × 10$^3$ | 1.2 × 10$^3$ | 9 × 10$^2$ |
| 10 × 10$^3$ | 2.8 × 10$^3$ | 2.2 × 10$^3$ | 3.6 × 10$^3$ | 3.4 × 10$^3$ | 7 × 10$^2$ | 6.4 × 10$^2$ |
| 13 × 10$^3$ | 1.4 × 10$^3$ | 1.2 × 10$^3$ | 3.0 × 10$^3$ | 2.8 × 10$^3$ | 5.8 × 10$^2$ | 5.5 × 10$^2$ |
| 15 × 10$^3$ | 1.0 × 10$^3$ | | 2.2 × 10$^3$ | | 5.2 × 10$^2$ | |

TABLE 2

| Extension force (g) | Resistance value R (Ω) | | | | | |
|---|---|---|---|---|---|---|
| | Embodiment 1 | | Embodiment 2 | | Comparative example | |
| | Extended | Restored | Extended | Restored | Extended | Restored |
| 0 | Over 10$^7$ | 10 × 10$^6$ | Over 10$^7$ | Over 10$^7$ | Over 10$^7$ | 10 × 10$^6$ |
| 50 | 800 × 10$^3$ | 800 × 10$^3$ | 800 × 10$^3$ | 720 × 10$^3$ | 300 × 10$^3$ | 180 × 10$^3$ |
| 100 | 500 × 10$^3$ | 200 × 10$^3$ | 410 × 10$^3$ | 320 × 10$^3$ | 70 × 10$^3$ | 40 × 10$^3$ |

TABLE 2-continued

| Extension force | Resistance value R (Ω) | | | | | |
|---|---|---|---|---|---|---|
| | Embodiment 1 | | Embodiment 2 | | Comparative example | |
| (g) | Extended | Restored | Extended | Restored | Extended | Restored |
| 200 | × 10³ | 66 × 10³ | 142 × 10³ | 116 × 10³ | 18 × 10³ | 14 × 10³ |
| 300 | × 10³ | 40 × 10³ | 75 × 10³ | 58 × 10³ | 10 × 10³ | 9.0 × 10³ |
| 400 | 20 × 10³ | 18 × 10³ | 46 × 10³ | 32 × 10³ | 8 × 10³ | |
| 500 | 16 × 10³ | 15 × 10³ | 29 × 10³ | 24 × 10³ | Cracked | |
| 600 | 14 × 10³ | 13.7 × 10³ | 20 × 10³ | 15 × 10³ | Broken | |
| 700 | 13.8 × 10³ | 13.5 × 10³ | 14.2 × 10³ | 12 × 10³ | | |
| 800 | 13.5 × 10³ | | 11 × 10³ | 9.4 × 10³ | | |
| 900 | | | 8.1 × 10³ | 7.4 × 10³ | | |
| 1000 | | | 5.8 × 10³ | | | |

TABLE 3

| Bending angle | Resistance value R (Ω) | | | | | |
|---|---|---|---|---|---|---|
| | Embodiment 1 | | Embodiment 2 | | Comparative example | |
| (°) | Bend | Restored | Bend | Restored | Bent | Restored |
| 0 | Over 10⁷ | Over 10⁷ | Over 10⁷ | Over 10⁷ | Over 10⁷ | Over 10⁷ |
| 45 | 1000 × 10³ | 900 × 10³ | 980 × 10³ | 1000 × 10³ | 200 × 10³ | 180 × 10³ |
| 90 | 300 × 10³ | 280 × 10³ | 100 × 10³ | 157 × 10³ | 20 × 10³ | |
| 135 | 140 × 10³ | 130 × 10³ | 49 × 10³ | 61 × 10³ | Cracked | |
| 180 | 70 × 10³ | | 22 × 10³ | | Broken | |

TABLE 4

| Torsional angle | Resistance value R (Ω) | | | | | |
|---|---|---|---|---|---|---|
| | Embodiment 1 | | Embodiment 2 | | Comparative example | |
| (°) | Rotated | Restored | Rotated | Restored | Rotated | Restored |
| 0 | Over 10⁷ | Over 10⁷ | Over 10⁷ | Over 10⁷ | Over 10⁷ | Over 10⁷ |
| 45 | 500 × 10³ | 480 × 10³ | 680 × 10³ | 880 × 10³ | 230 × 10³ | 200 × 10³ |
| 90 | 300 × 10³ | 290 × 10³ | 86 × 10³ | 138 × 10³ | 26 × 10³ | |
| 135 | 200 × 10³ | 180 × 10³ | 44 × 10³ | 51 × 10³ | Cracked | |
| 180 | 100 × 10³ | | 20 × 10³ | | Broken | |

Figure 8:
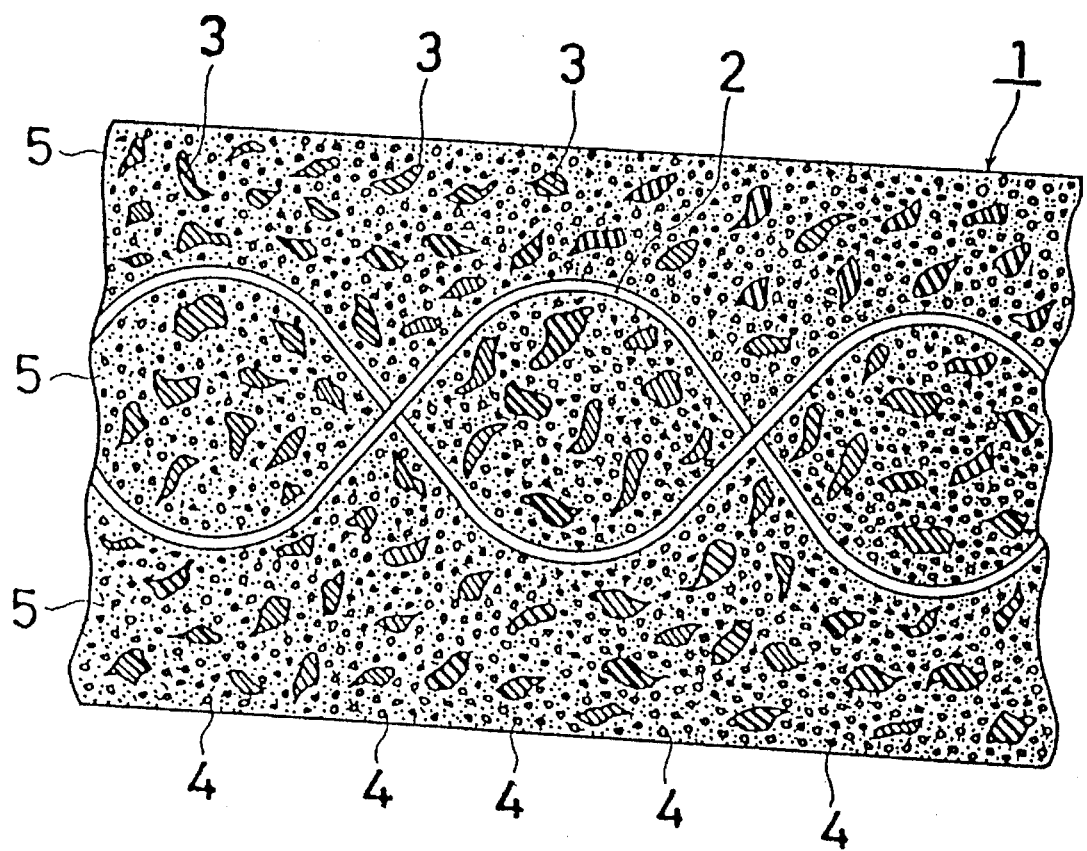
FIG. 8 is a sectional view of the internal texture of a variable resistance conductive elastomer according to the present invention having an insulating and elastic fiber, with repeated stitches, incorporated therein.
Figure 9:
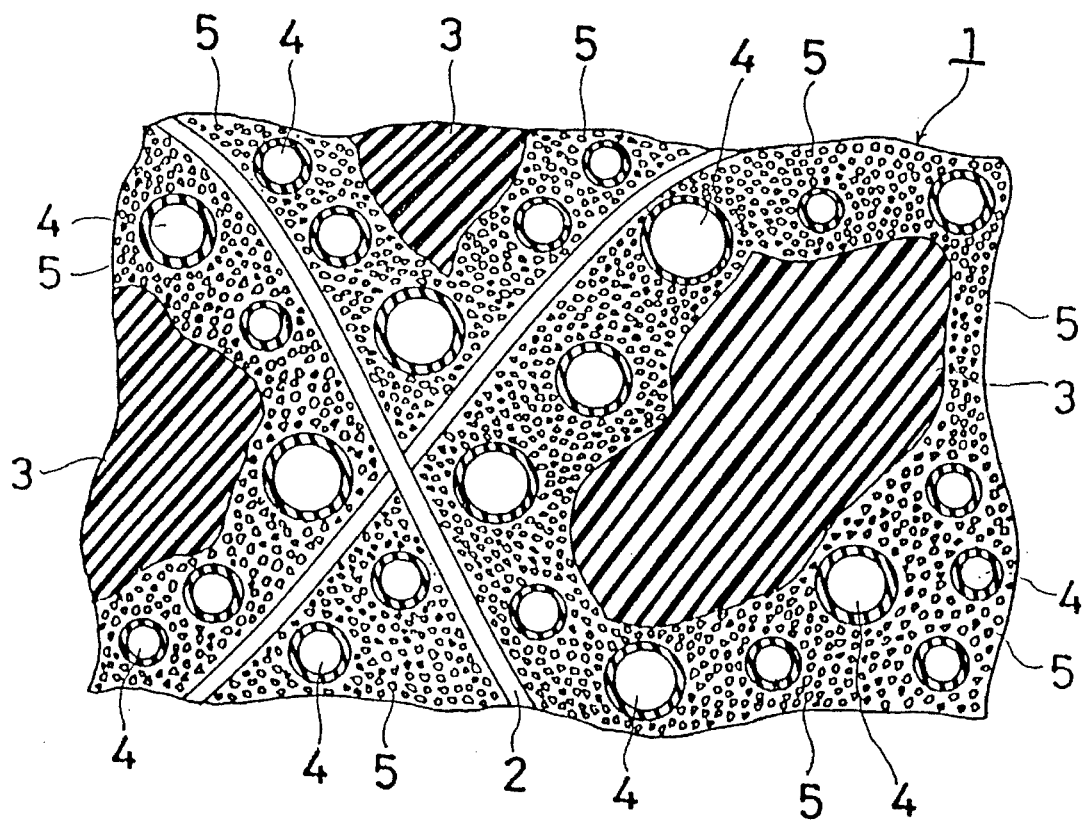
FIG. 9 is an enlarged sectional view of the internal texture of a variable-resistance conductive elastomer of the present invention having an insulating and elastic fiber, with repeated stitches, incorporated therein.

FIGS. 8 and 9 illustrate the inner texture of the variable-resistance conductive elastomer of embodiment 2, into which an insulating and elastic fiber having repeated stitches was incorporated. Insulating and elastic fibers 2 having repeated stitches, elastomer particles 3, hollow and elastic microspheres 4 and the conductive particles 5 are shown as being dispersed in the non-conductive elastomer 1.

Figure 10:
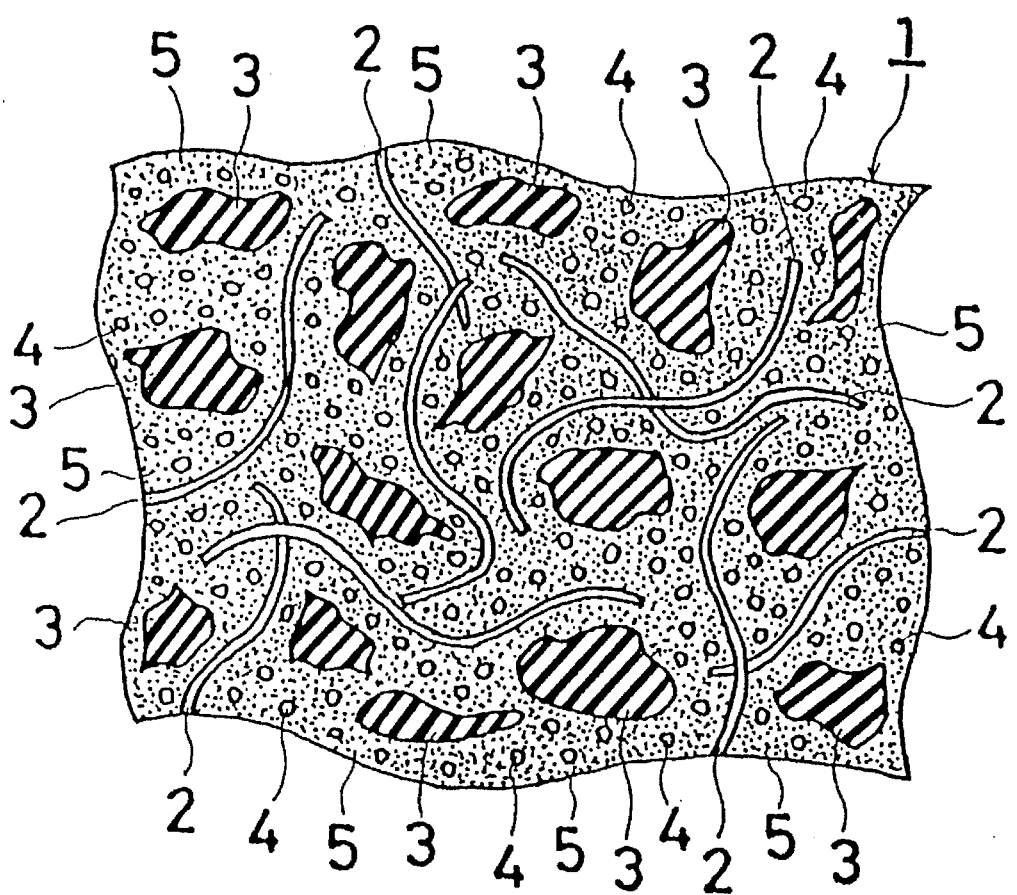
FIG. 10 is a sectional view of the internal texture of the variable-resistance conductive elastomer of the present invention having a curved and formless fiber incorporated therein.

FIG. 10 shows the inner texture of a variable-resistance conductive elastomer into which a curved and formless insulating and elastic fiber was mixed. (Reference numbers 1–5 have the same meaning as in FIGS. 8 and 9). The elastomer was prepared by mixing and kneading the insulating and elastic polyamide fibers 2, 13 denier in thickness and 6 mm in length, and the other constituents 1, 3, 4, and 5 with one another prior to molding. The mixing and kneading causes the insulating and elastic fibers 2 to be curved in irregular directions. Instead of the polyamide fibers used in embodiment 2, polyethylene fibers (Tekmilone made by Mitsui Sekiyu Kagaku Kabushiki Kaisha) or (Spectra 900 or Spectra 1000 made by Allied) may be utilized to further improve the strength of the elastomer.

I claim:

1. An elastomeric composition, which is in a non-conductive state when not deformed, and which becomes conductive when deformed by compression, extension, torsion or bending, comprising a non-conductive elastomer consisting essentially of a silicone rubber having dispersed therein (i) elastomer particles, 10–300 μm in diameter, (ii) 25–45% by weight of conductive particles, 1–40 μm in diameter, based on the weight of the composition, and (iii) 10–35% by weight of hollow and elastic microspheres, 10–150 μm in particle diameter, based on the weight of the composition.

2. An elastomeric composition as defined in claim 1, wherein the elastomer particles are of a silicone rubber powder and the hollow and elastic microspheres are of a vinylidene chloride-acrylonitrile copolymer.

3. An elastomeric composition as defined in claim 1, wherein the conductive particles are spherical carbon particles and wherein 30–70% of the surface area of the spherical carbon particles is covered by insulating particles, 0.05–0.2 μm in diameter, selected from the group consisting of calcium oxide, titanium dioxide and silicon oxide, adhered to the spherical carbon particles.

4. An elastomeric composition as defined in claim 1 further having 0.01–0.1% by weight of elastic and insulating fibers, 7–100 denier thick and 3–6 mm in length, selected from the group consisting of polyethylene, polyamide, aramid, polyester and polyurethane fibers, and composite fibers thereof, dispersed in the elastomeric composition.

5. An elastomeric composition as defined in claim 4, wherein the surface of the elastic and insulating fibers is chemically activated by treatment with a coupling agent.

6. An elastomeric composition as defined in claim 4, wherein the surface of the elastic and insulating fibers is activated by exposure to ultraviolet light, a plasma or an ion beam.

7. An elastomeric composition as defined in claim 4, wherein the elastic and insulating fibers are randomly dispersed in the non-conductive elastomer.

* * * * *